United States Patent
Karasawa

(10) Patent No.: US 12,415,386 B2
(45) Date of Patent: Sep. 16, 2025

(54) TIRE

(71) Applicant: BRIDGESTONE CORPORATION, Tokyo (JP)

(72) Inventor: Mayuko Karasawa, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 18/579,935

(22) PCT Filed: Jun. 22, 2022

(86) PCT No.: PCT/JP2022/024944
§ 371 (c)(1),
(2) Date: Jan. 17, 2024

(87) PCT Pub. No.: WO2023/008000
PCT Pub. Date: Feb. 2, 2023

(65) Prior Publication Data
US 2024/0336090 A1 Oct. 10, 2024

(30) Foreign Application Priority Data
Jul. 30, 2021 (JP) .................. 2021-126245

(51) Int. Cl.
*B60C 11/03* (2006.01)
*B60C 11/04* (2006.01)
(Continued)

(52) U.S. Cl.
CPC ............ *B60C 11/13* (2013.01); *B60C 11/032* (2013.01); *B60C 11/04* (2013.01); *B60C 11/12* (2013.01);
(Continued)

(58) Field of Classification Search
CPC ....... B60C 11/032; B60C 11/04; B60C 11/12; B60C 2011/0346; B60C 2011/0353; B60C 19/002
See application file for complete search history.

(56) References Cited

U.S. PATENT DOCUMENTS

| 7,906,641 B2 | 3/2011 | Zhou et al. |
| 8,978,722 B2 | 3/2015 | Suzuki |

(Continued)

FOREIGN PATENT DOCUMENTS

| JP | S59124412 A | 7/1984 |
| JP | 2004351953 A | 12/2004 |

(Continued)

OTHER PUBLICATIONS

Machine translation for Japan 2008-201200 (Year: 2024).*
(Continued)

*Primary Examiner* — Steven D Maki
(74) *Attorney, Agent, or Firm* — KENJA IP LAW PC

(57) ABSTRACT

Provided in this disclosure is a tire with a meandering groove extending along tire circumferential direction formed on a tread surface, wherein the meandering groove has a groove width in tire width direction that varies at a predetermined repetitive cycle along the tire circumferential direction, ratio of the maximum and minimum widths of the groove width, Wmin/Wmax, is 0.35 to 0.85, a first groove wall and a second groove wall, which are both groove walls of the meandering groove, meander and extend in a sinusoidal manner with the predetermined repetition cycle as one cycle length in a tread surface view, and in the tread surface view, a first sinusoidal curve formed by the first groove wall and a second sinusoidal curve formed by the second groove wall are arranged with a phase difference of ⅛ to ⅜ cycle in the tire circumferential direction.

15 Claims, 6 Drawing Sheets

(51) Int. Cl.
  *B60C 11/12* (2006.01)
  *B60C 11/13* (2006.01)
  *B60C 19/00* (2006.01)

(52) U.S. Cl.
  CPC .... *B60C 19/002* (2013.01); *B60C 2011/0346* (2013.01); *B60C 2011/0353* (2013.01); *B60C 2011/0381* (2013.01)

(56) References Cited

U.S. PATENT DOCUMENTS

| | | | |
|---|---|---|---|
| 2010/0101695 A1* | 4/2010 | Ueda | B60C 11/0302 152/209.15 |
| 2012/0118460 A1* | 5/2012 | Kiwaki | B60C 11/1376 152/209.18 |
| 2013/0000806 A1* | 1/2013 | Sugiyasu | B60C 11/042 152/209.24 |
| 2016/0075184 A1* | 3/2016 | Kato | B60C 11/0327 152/209.8 |

FOREIGN PATENT DOCUMENTS

| | | | | |
|---|---|---|---|---|
| JP | 2008-201200 A | * | 9/2008 | ......... B60C 11/0309 |
| JP | 2010179892 A | | 8/2010 | |
| JP | 2011016822 A | | 1/2011 | |
| JP | 2011168222 A | | 9/2011 | |
| JP | 2013035479 A | | 2/2013 | |
| JP | 2014-076764 A | * | 5/2014 | |
| JP | 6236857 B2 | | 11/2017 | |
| JP | 2018138410 A | | 9/2018 | |
| JP | 2018138426 A | | 9/2018 | |
| JP | 2018140647 A | | 9/2018 | |
| JP | 2022077142 A | | 5/2022 | |
| WO | 2011093266 A1 | | 8/2011 | |

OTHER PUBLICATIONS

Machine translation for Japan 2014-076764 (Year: 2024).*
Jan. 18, 2024, International Preliminary Report on Patentability issued in the International Patent Application No. PCT/JP2022/024944.
Oct. 2, 2024, search result of the Extended European Search Report issued by the European Patent Office in the corresponding European Patent Application No. 22849075.1.
Sep. 6, 2022, International Search Report issued in the International Patent Application No. PCT/JP2022/024944.

* cited by examiner

FIG. 5A
FIG. 5B
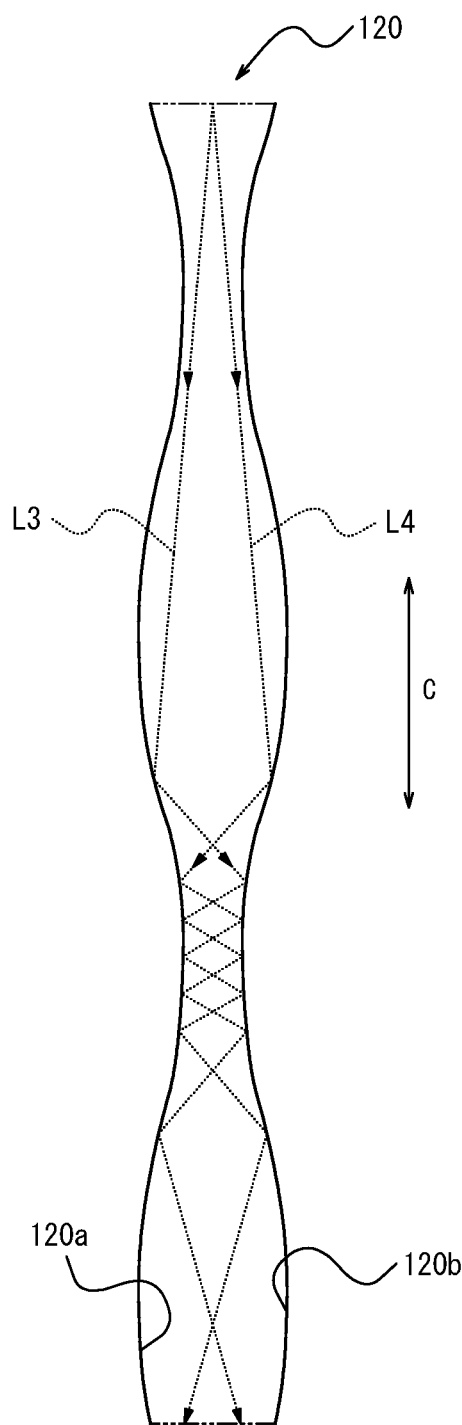
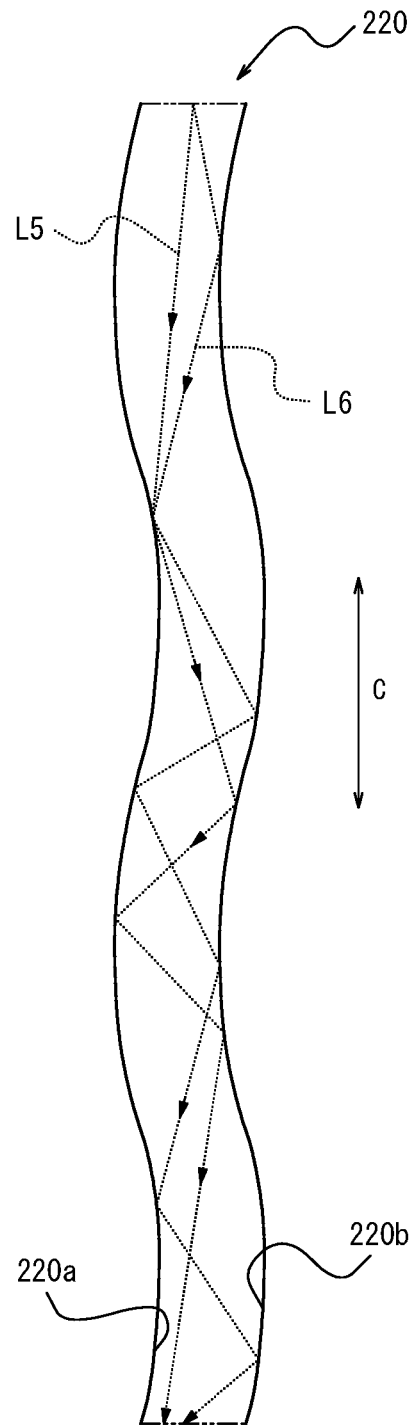

TIRE

TECHNICAL FIELD

The present disclosure relates to a tire.

BACKGROUND

Various methods have been used to improve the drainage of water that enters between the road surface and the tread surface in pneumatic tires (hereinafter simply referred to as "tires") in order to suppress hydroplaning. Patent Document 1 discloses a tire that can improve drainage performance while preventing degradation of braking performance.

CITATION LIST

Patent Literature

PTL 1: JP2011/168222 A1

SUMMARY

Technical Problem

In the tire disclosed in Patent Document 1, the main groove as a circumferential groove extending along the tier circumferential direction has a predetermined shape. This allows the tire disclosed in Patent Document 1 to improve drainage performance while preventing degradation of braking performance. However, even with the circumferential groove in the tire described in Patent Document 1, there is still room for improvement in terms of further control of air column resonance sound.

It is therefore an object of the present disclosure to provide a tire with a meandering groove on its tread surface, which can improve drainage performance and control air column resonance sound, while preventing degradation of braking performance.

Solution to Problem

The tire as a first aspect of the present disclosure is a tire with a meandering groove extending along tire circumferential direction formed on a tread surface, wherein the meandering groove has a groove width in tire width direction that varies at a predetermined repetitive cycle along the tire circumferential direction, when the maximum width of the groove width is Wmax and the minimum width of the groove width is Wmin, ratio of the maximum and minimum widths, Wmin/Wmax, is 0.35 to 0.85, a first groove wall and a second groove wall, which are both groove walls of the meandering groove, meander and extend in a sinusoidal manner with the predetermined repetition cycle as one cycle length in a tread surface view, and in the tread surface view, a first sinusoidal curve formed by the first groove wall and a second sinusoidal curve formed by the second groove wall are arranged with a phase difference of ⅛ to ⅜ cycle in the tire circumferential direction.

Advantageous Effect

The present disclosure can provide a tire with a meandering groove on its tread surface, which can improve drainage performance and control air column resonance sound, while preventing degradation of braking performance.

BRIEF DESCRIPTION OF THE DRAWINGS

In the accompanying drawings:

FIG. 5 illustrates meandering grooves as Comparative Examples; and

DETAILED DESCRIPTION

Figure 1:
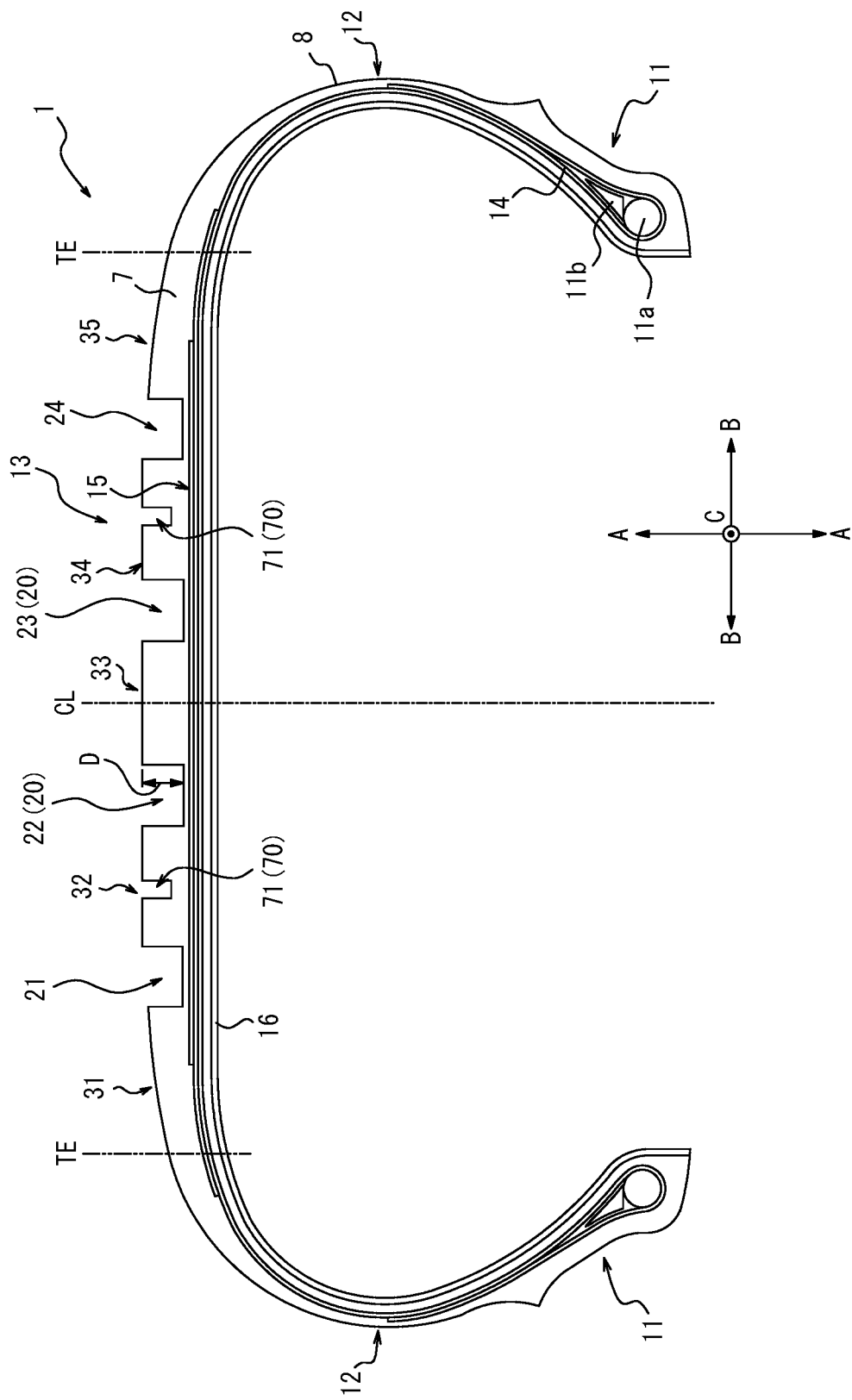
FIG. 1 is a cross-sectional view in the tire width direction of a tire as an embodiment of the present disclosure.

The following is an illustrative description of embodiments of the tire in accordance with the present disclosure, with reference to the drawings. In each figure, common components are designated by the same reference numerals. In this document, the tire width direction refers to the direction parallel to the axis of tire rotation. The tire radial direction refers to the radial direction orthogonal to the axis of tire rotation and centered on the axis of rotation. The tire circumferential direction refers to the direction in which the tire rotates around its axis of rotation.

In this document, the term "tread surface" means the outer circumferential surface of the tire that is in contact with the road surface when the tire is assembled on a rim, filled with prescribed internal pressure, and rolled under a maximum load (hereinafter also referred to as the "maximum load condition"). In addition, the term "tread edge" means the outer edge of the tread surface in the tire width direction.

As used herein, the term "rim" refers to the standard rim in the applicable size (Measuring Rim in ETRTO's STANDARDS MANUAL and Design Rim in TRA's YEAR BOOK) as described or as may be described in the future in the industrial standard, which is valid for the region in which the tire is produced and used, such as JATMA YEAR BOOK of JATMA (Japan Automobile Tyre Manufacturers Association) in Japan, STANDARDS MANUAL of ETRTO (The European Tyre and Rim Technical Organization) in Europe, and YEAR BOOK of TRA (The Tire and Rim Association, Inc.) in the United States. For sizes not listed in these industrial standards, the term "rim" refers to a rim with a width corresponding to the bead width of the pneumatic tire. The "rim" includes current sizes as well as future sizes that could be included in the aforementioned industrial standards. An example of the "size as described in the future" includes the sizes listed as "FUTURE DEVELOPMENTS" in the ETRTO 2013 edition.

As used herein, the "prescribed internal pressure" refers to the air pressure (maximum air pressure) corresponding to the maximum load capacity of a single wheel in the applicable size and ply rating, as described in the aforementioned JATMA YEAR BOOK and other industrial standards. In the case that the size is not listed in the aforementioned industrial standards, the "prescribed internal pressure" refers to the air pressure (maximum air pressure) corresponding to the maximum load capacity specified for each vehicle in which the tire is mounted. Further, as used herein, the term "maximum load" means the load corresponding to the maximum load capacity in the tire of the applicable size described in the aforementioned industrial standards, or, for sizes not listed in the aforementioned industrial standards, the load corresponding to the maximum load capacity specified for each vehicle in which the tire is mounted.

A pneumatic tire 1 (hereinafter simply referred to as "tire 1") as an embodiment of the tire in accordance with the present disclosure will be exemplified below with reference to the drawings. In this embodiment, a radial tire for passenger vehicles will be illustrated as an example of the tire 1, but other types of tires may also be used.

FIG. 1 is a cross-sectional view in the tire width direction of the tire 1. As illustrated in FIG. 1, the tire 1 comprises a pair of bead portions 11, a pair of sidewall portions 12, and a tread portion 13. The sidewall portions 12 are continuous with the outer side in the tire radial direction A of the bead portions 11. The tread portion 13 is connected to the pair of sidewall portions 12. Each of two ends in the tire width direction B of the tread portion 13 is connected to each sidewall portion 12.

Each bead portion 11 comprises a bead core 11a and a bead filler 11b that is disposed on the outer side in the tire radial direction A of the bead core 11a. The tire 1 comprises a carcass 14 that straddles between the pair of bead cores 11a. The carcass 14 is composed of carcass plies in which cords made of organic fibers or steel are arranged. Furthermore, the tire 1 comprises a belt 15, which is disposed on the outer side in the tire radial direction A of the crown portion of the carcass 14. The belt 15 is composed of belt plies in which cords made of organic fibers or steel are arranged. The belt plies which compose the belt 15 may include an inclined belt layer in which the cords are inclined at 10° or more with respect to the tire circumferential direction C. Also, the belt plies which compose the belt 15 may also include a circumferential belt layer in which the cords extend along the tire circumferential direction C. Here, the term "the cords extend along the tire circumferential direction" means that the inclination angle of the cords with respect to the tire circumferential direction C is greater than 0° and less than 10°. Furthermore, the belt 15 may comprise a plurality of belt plies stacked in the tire radial direction A, including at least one inclined belt layer and at least one circumferential belt layer described above.

The tire 1 also comprises a tread rubber 7 disposed on the outer side in the tire radial direction A of the belt 15 and side rubbers 8 disposed on the outer side in the tire width direction B of the side portion of the carcass 14. Furthermore, the tire 1 comprises an inner liner 16 that is laminated to the inner surface of the carcass 14.

The tire 1 in this embodiment comprises the internal structure described above, but the internal structure is not limited. Thus, the tire 1 may comprise other internal structures.

Figure 2:
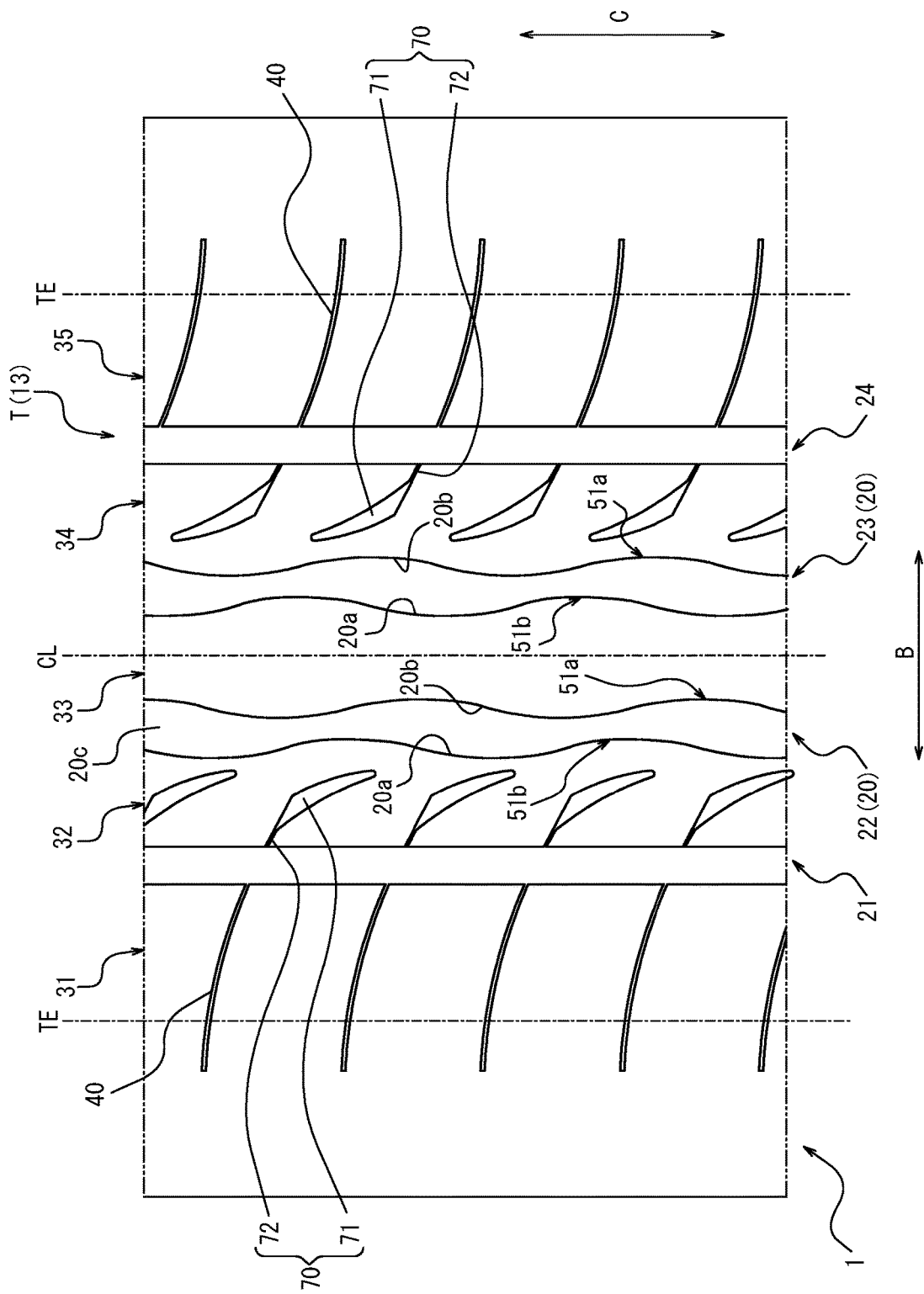
FIG. 2 is a development view of a portion of the tread surface of the tire illustrated in FIG. 1.

FIG. 2 is a development view of a portion of the tread surface T of the tread portion 13 of the tire 1 illustrated in FIG. 1. As illustrated in FIG. 2, circumferential grooves 21 to 24 extending along the tire circumferential direction C are formed on the tread surface T in this embodiment. These circumferential grooves 21 to 24 are unterminated annular grooves in the tire circumferential direction C. The four circumferential grooves 21 to 24 of this embodiment are composed of two external circumferential grooves 21 and 24, which are the outermost two grooves on both sides in the tire width direction B, and two internal circumferential grooves 22 and 23, which are located at inner side in the tire width direction B of the two external circumferential grooves 21 and 24. Here, the inner side in the tire width direction B means the side approaching the tire equatorial plane CL in the tire width direction B. The outer side in the tire width direction B means the side in the tire width direction B opposite the inner side in the tire width direction B and away from the tire equatorial plane CL in the tire width direction B.

As illustrated in FIG. 2, on the tread surface T of the tire 1 in this embodiment, five land portions 31 to 35, which are defined by the four circumferential grooves 21 to 24 described above and both tread edges TE in the tire width direction B, are formed. The five land portions 31 to 35 are composed of one central land portion 33, two intermediate land portions 32 and 34, and two shoulder land portions 31 and 35. The "central land portion" and the "intermediate land portion" are both land portions located between the two outermost circumferential grooves on each side in the tire width direction B, and mean the land portions that are defined between the two adjacent circumferential grooves in the tire width direction B. However, the "central land portion" is the land portion provided at the position intersecting the tire equatorial plane CL, while the "intermediate land portion" is the land portion provided at the position not intersecting the tire equatorial plane CL. For convenience of explanation, the central land portion 33 and the intermediate land portions 32 and 34 will hereinafter be referred to simply as "internal land portions 32 to 34" when not specifically distinguished. The "shoulder land portions" are the land portions between the tread edges TE, and the tire circumferential grooves located at the outermost in the tire width direction.

More specifically, the central land portion 33 in this embodiment is defined between the two internal circumferential grooves 22 and 23. One intermediate land portion 32 in this embodiment is located on one side in the tire width direction B across the tire equatorial plane CL (left side in FIG. 2), and is defined between the external circumferential groove 21 and the internal circumferential groove 22. The other intermediate land portion 34 in this embodiment is located on the other side in the tire width direction B across the tire equatorial plane CL (right side in FIG. 2), and is defined between the external circumferential groove 24 and the internal circumferential groove 23. Each of the internal land portions 32 to 34 in this embodiment is composed of a rib-shaped land portion that is not divided in the circumferential direction C but is connected over the entire tire circumferential direction C.

Furthermore, one shoulder land portion 31 is located on one side in the tire width direction B across the tire equatorial plane CL (left side in FIG. 2), and is defined between the tread edge TE and the external circumferential groove 21. The other shoulder land portion 35 is located on the other side in the tire width direction B across the tire equatorial plane CL (right side in FIG. 2), and is defined between the tread edge TE and the external circumferential groove 24.

As will be described in detail later, as illustrated in FIG. 2, each of the two intermediate land portions 32 and 34 in this embodiment is provided with a resonator 70 that includes an air chamber 71 and an external narrowed neck 72. Each intermediate land portion 32 and 34 is provided with a plurality of resonators 70 spaced at predetermined intervals along the tire circumferential direction C.

As illustrated in FIG. 2, each of the two shoulder land portions 31 and 35 in this embodiment is provided with a plurality of width direction grooves 40. The width direction grooves 40 are not limited to grooves parallel to the tire width direction B, but may be grooves that slope at a predetermined angle or less than the predetermined angle (e.g., 30° or less) with respect to the tire width direction B. In each of the two shoulder land portions 31 and 35, the plurality of width direction grooves 40 are arranged at predetermined intervals in the tire circumferential direction C. The width direction grooves 40 extend over the entire tire area of each shoulder land portion 31 and 35 in the tire width direction B. Thus, each of the shoulder land portions 31 and 35 is composed of a plurality of block land portions that are divided in the tire circumferential direction C by the width direction grooves 40.

The width direction grooves 40 in one shoulder land portion 31 extend from the tread edge TE to the external circumferential groove 21. Also, the width direction grooves 40 in the other shoulder land portion 35 extend from the tread edge TE to the external circumferential groove 24.

More specifically, the outer ends in the tire width direction B of the width direction grooves 40 formed in the shoulder land portions 31 and 35 extend to the tread edges TE. In particular, in this embodiment, the outer ends in the tire width direction B of the width direction grooves 40 extend beyond the tread edges TE to a position outer side in the tire width direction B from the tread edges TE. The inner ends in the tire width direction B of the width direction grooves 40 in the shoulder land portions 31 and 35 are open to the external circumferential grooves 21 and 24. In other words, the width direction grooves 40 formed in the shoulder land portion 31 are connected to the external circumferential groove 21 at the inner side in the tire width direction B. Also, the width direction grooves 40 formed in the shoulder land portion 35 are connected to the external circumferential groove 24 at the inner side in the tire width direction B.

The tread surface T of the tire 1 in this embodiment comprises four circumferential grooves 21 to 24, but is not limited to this configuration. The tire 1 should have one or more circumferential grooves on the tread surface T. In other words, the number of circumferential grooves formed on the tread surface T of the tire 1 is not particularly limited as long as there is one or more. Therefore, the land portions formed on the tread surface T of the tire 1 are also not limited to the five land portions 31 to 35 such as in this embodiment. In other words, the tread surface T of tire 1 should be provided with two or more land portions which are defined by one or more circumferential grooves and the tread edges of both sides in the tire width direction B.

The configuration of each land portion of the tire 1 is also not limited to this configuration. The shoulder land portions 31 and 35 in this embodiment are provided with the width direction grooves 40, but they may be configured without the width direction grooves 40. Also, the width direction grooves 40 do not have to cross each shoulder land portion 31 and 35 in the tire width direction B. In other words, one or both ends of the width direction groove 40 may terminate within each shoulder land 31 and 35.

Furthermore, each of the intermediate land portions 32 and 34 in this configuration is provided with resonators 70, however, they may be configured without the resonators 70. The resonators 70 may be provided in either of the intermediate land portions 32 or 34. For example, the resonators 70 may be provided only in one of the intermediate land portions 32 and 34, which will be on the inside (vehicle side) when the tire 1 is mounted on the vehicle. In this way, it is easier to ensure rigidity during cornering with respect to the other intermediate land portions 32 and 34, which will be on the outside (opposite side of the vehicle) when the tire 1 is mounted on the vehicle. Furthermore, the resonators 70 may be provided in the central land portion 33 or in the shoulder land portions 31 and 35.

Figure 3:
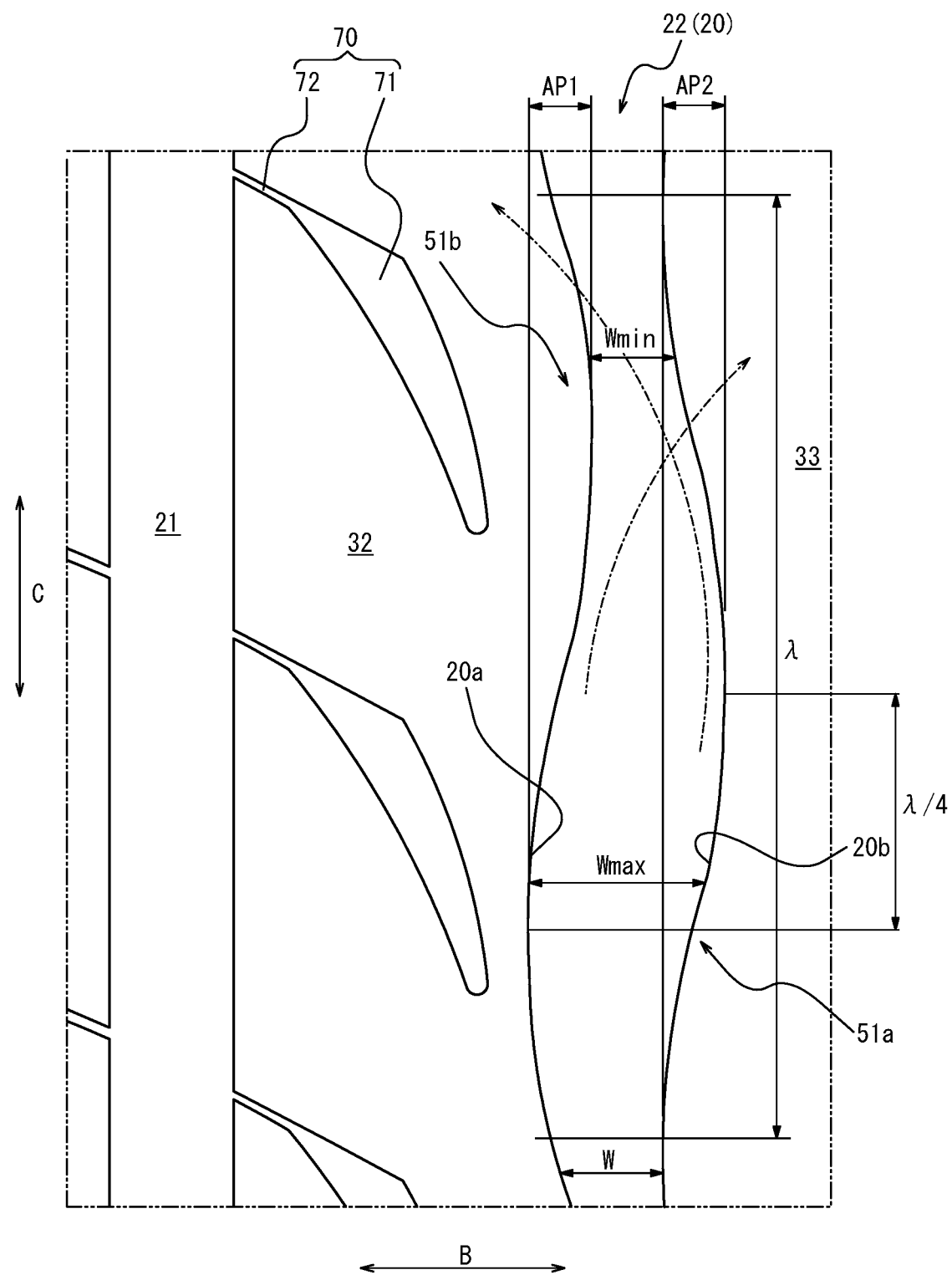
FIG. 3 is an enlarged view of one meandering groove on the tread surface illustrated in FIG. 2.

The meandering groove 20 formed on the tread surface T are described below with reference to FIGS. 2 and 3. In this embodiment, the two internal circumferential grooves 22 and 23 on the tread surface T are composed of meandering grooves. FIG. 3 is an enlarged view of the internal circumferential groove 22 as a meandering groove 20 illustrated in FIG. 2. The configuration of the internal circumferential groove 23 as a meandering groove 20 is the same as that of the internal circumferential groove 22. Hereafter, the two internal circumferential grooves 22 and 23 will simply be referred to as "meandering groove 20" if they are not specifically distinguished.

As illustrated in FIGS. 2 and 3, the meandering groove 20 extends along the tire circumferential direction C at the tread surface T. More specifically, the first groove wall 20*a* and the second groove wall 20*b*, which are both groove walls of the meandering groove 20, meander and extend in a sinusoidal manner with a predetermined repetition cycle λ as one cycle length (see FIG. 3) along the tire circumferential direction C, in the tread surface view, the front view of the tread surface T (see FIG. 2 and FIG. 3). Thus, as illustrated in FIG. 3, the first groove wall 20*a* and the second groove wall 20*b* have an amplitude A along the tire width direction B. As described below in detail, the first sinusoidal curve formed by the first groove wall 20*a* of the meandering groove 20 has a phase difference in the tire circumferential direction C from the second sinusoidal curve formed by the second groove wall 20*b* of the meandering groove 20, as viewed from the tread surface. The groove bottom 20*c* of the meandering groove 20 is made up of a flat surface extending along the tire circumferential direction C. Note, that the term "sinusoidal" here is not limited to perfect sinusoidal waves, but includes substantial sinusoidal waves. As is used herein, a substantial sinusoidal wave is one whose variation with respect to the sinusoidal wave obtained as an approximate curve is within ±5% or less. The sinusoidal wave as an approximate curve can be, for example, a sinusoidal wave approximated by the least-squares method for a curve obtained by tracing the groove wall in the tread surface view.

As illustrated in FIG. 3, the meandering groove 20 has a width groove W that varies with a predetermined repetitive cycle λ along the tire circumferential direction C. This predetermined repetition cycle λ is the same as the repetition cycle λ described above for the first groove wall 20*a* and the second groove wall 20*b* of the meandering groove 20, which extend in a sinusoidal manner in the tread surface view. The width W of the meandering groove 20 means the distance in the tire width direction B between the first groove wall 20*a* and the second groove wall 20*b*. Thus, the meandering groove 20 comprises a wide section 51*a* and a narrow section 51*b*.

The wide section 51*a* includes the part where the groove width W reaches the maximum width Wmax. The narrow section 51*b* includes the part where the groove width W reaches the minimum width Wmin. The wide section 51*a* and the narrow section 51*b* are provided alternately in the tire circumferential direction C.

Here, the ratio of the maximum width Wmax and the minimum width Wmin of the meandering groove 20, Wmin/Wmax, is 0.35 to 0.85. As an example, the maximum width Wmax of the groove width W in this embodiment is 9.447 mm. The minimum width Wmin of the groove width W in this embodiment is 5.967 mm. Therefore, the ratio of the maximum width Wmax and the minimum width Wmin in this embodiment, Wmin/Wmax, is 0.632.

In this way, the first groove wall 20*a* and the second groove wall 20*b* of the meandering groove 20 meander along the tire circumferential direction C in the tread surface view, and the groove width W of the meandering groove 20 varies at a predetermined repetition cycle λ along the tire circumferential direction C. Therefore, a flow of water along the meandering of the first groove wall 20*a* and the second groove wall 20*b* occurs in the meandering groove 20. In other words, a flow of water along the first groove wall 20*a* and the second groove wall 20*b* occurs in the meandering groove 20.

More specifically, water flowing in the meandering groove 20 flows through the wide section 51*a*, which includes the part of the meandering groove 20 where the groove width W reaches the maximum width Wmax, and then flows toward the narrow section 51*b*, which includes the part of the meandering groove 20 where the groove width W reaches the minimum width Wmin. At this time, the water flowing in the meandering groove 20 flows along the first groove wall 20*a* and the second groove wall 20*b* as the groove width W of the meandering groove 20 decreases. As illustrated in FIG. 3, in the tread surface view, the direction of the extensions of the first groove wall 20*a* and the second groove wall 20*b* which are positioned halfway from the wide section 51*a* to the narrow section 51*b* (see the single-pointed arrows in FIG. 3) are directed toward the outer side in the tire width direction B of the meandering groove 20. Therefore, water flowing in the meandering groove 20 tends to drain out of the meandering groove 20 in the direction of the extensions of the first groove wall 20*a* and the second groove wall 20*b* as it flows from the wide section 51*a* to the narrow section 51*b*. In other words, water flowing in the meandering groove 20 pulsates with a predetermined repetition cycle λ and tends to drain in the direction of the extensions of the first groove wall 20*a* and the second groove wall 20*b* as it flows from the wide section 51*a* to the narrow section 51*b*. This improves drainage performance of water that has entered between the road surface and the tread surface T.

As mentioned above, by setting Wmin/Wmax, which is the ratio of the maximum width Wmax and the minimum width Wmin of the meandering groove 20, to 0.35-0.85, compared to the case where Wmin/Wmax does not belong to the above range, the depression of the land portion formed by the first groove wall 20*a* and the second groove wall 20*b* which meander and extend in a sinusoidal manner (in this embodiment, the depression of the sidewalls of the internal land portions 32 to 34), prevents the rigidity of the land portions (in this embodiment, the internal land portions 32 to 34) from being reduced.

Furthermore, by setting Wmin/Wmax in the above range, the above-mentioned improvement in drainage performance can be obtained more reliably. That is, if the value of Wmin/Wmax is smaller than 0.35, the flow of water along the first groove wall 20*a* and the second groove wall 20*b* and the flow of water along the tire circumferential direction C may easily become excessively concentrated in the narrow section 51*b*, and the degree of improvement in drainage performance may become smaller. If the value of Wmin/Wmax is greater than 0.85, water in the meandering groove 20 may be less likely to pulsate, and the degree of improvement in drainage performance may be smaller.

In addition, as illustrated in FIGS. 2 and 3, in the tread surface view, the first sinusoidal curve formed by the first groove wall 20*a* of the meandering groove 20 and the second sinusoidal curve formed by the second groove wall 20*b* are arranged with a phase difference of ⅛ to ⅜ cycle in the tire circumferential direction C. This phase difference can suppress the air column resonance sound that can be generated by the meandering groove 20, compared to a configuration where the phase difference falls in outside the above range.

Note, that the term "phase difference of ⅛ to ⅜ cycle in tire circumferential direction C" means a phase difference of ⅛ to ⅜ cycle in either one direction in tire circumferential direction C. The phase difference in this embodiment illustrated in FIGS. 2 and 3 is ¼ cycle.

Figure 4:
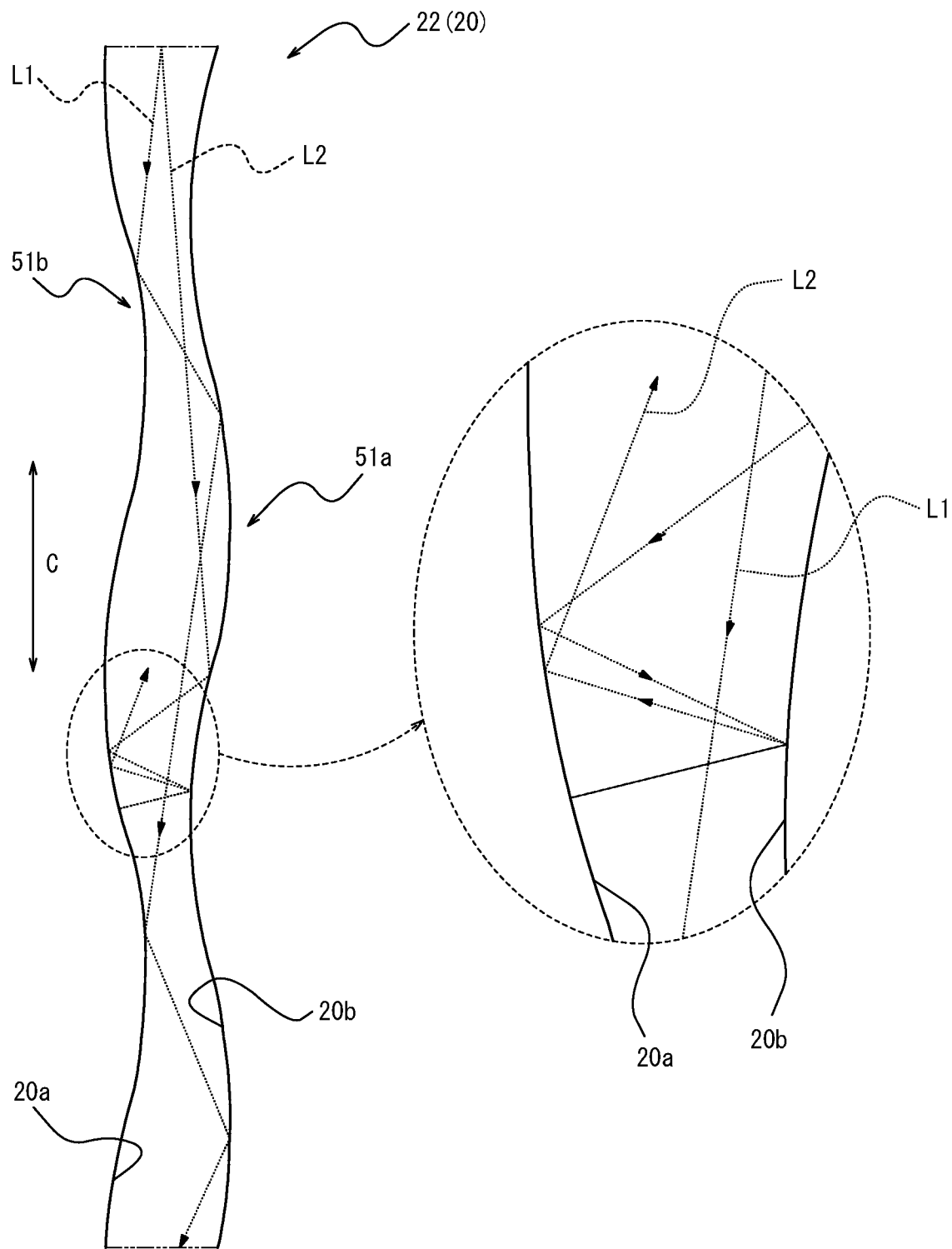
FIG. 4 is an explanatory diagram explaining the reflection of some sound waves in the meandering groove illustrated in FIG. 3.

FIG. 4 illustrates some sound waves traveling in the meandering groove 20 illustrated in FIGS. 2 and 3 by dashed arrows L1 and L2. As illustrated in FIG. 4, the sound wave represented by the dashed arrow L1 traveling in the meandering groove 20 enters the meandering groove 20 from one end in the tire circumferential direction C of the meandering groove 20 (the upper side in FIG. 4), is repeatedly reflected by the first groove wall 20*a* and the second groove wall 20*b*, and exits from the other end in the tire circumferential direction C of the meandering groove 20 (the lower side in FIG. 4). In contrast, the sound wave represented by the dashed arrow L2 traveling in the meandering groove 20 enters the meandering groove 20 from one end in the tire circumferential direction C of the meandering groove 20 (the upper side in FIG. 4) and is repeatedly reflected by the first groove wall 20*a* and the second groove wall 20*b*, returning to the one end in the tire circumferential direction C of the meandering groove 20 (the upper side in FIG. 4). In other words, the sound wave represented by the dashed arrow L2 traveling in the meandering groove 20 does not exit from the other end in the tire circumferential direction C of the meandering groove 20 (the lower side in FIG. 4). The presence of the sound wave represented by the dashed arrow L2 suppresses the air column resonance sound generated through the meandering groove 20 compared to the case where the sound wave represented by the dashed arrow L2 is not present.

FIG. 5 illustrates meandering grooves 120 and 220 as Comparative Examples. Specifically, FIG. 5A illustrates a Comparative Example in which the phase difference in the tire circumferential direction C of the first groove wall 120*a* and the second groove wall 120*b* is ½ cycle. FIG. 5B illustrates a Comparative Example in which there is no phase difference in the tire circumferential direction C between the first groove walls 220*a* and the second groove wall 220*b* (the phase difference is 0 cycle). In FIG. 5A, some sound waves traveling in the meandering groove 120 are represented by dashed arrows L3 and L4. In FIG. 5B, some sound waves traveling in the meandering groove 220 are represented by dashed arrows L5 and L6. Note, that in both meandering grooves 120 and 220 as Comparative Examples illustrated in FIGS. 5A and 5B, the ratio of the maximum width Wmax and the minimum width Wmin, Wmin/Wmax, is in the range of 0.35 to 0.85.

As illustrated in FIG. 5A, the sound wave represented by the dashed arrows L3 and L4 traveling in the meandering groove 120 as a Comparative Example enters the meandering groove 120 from one end in the tire circumferential direction C of the meandering groove 120 (the upper side in FIG. 5A), is repeatedly reflected by the first groove wall 120*a* and the second groove wall 120*b*, and exits from the other end in the tire circumferential direction C of the meandering groove 120 (the lower side in FIG. 5A). Similarly, the sound wave represented by the dashed arrows L5 and L6 traveling in the meandering groove 120 as a Comparative Example enters the meandering groove 220 from one end in the tire circumferential direction C of the meandering groove 220 (the upper side in FIG. 5B), is repeatedly reflected by the first groove wall 220*a* and the second groove wall 220*b*, and exits from the other end in the tire circumferential direction C of the meandering groove 220 (the lower side in FIG. 5B). In this way, with the phase differences in the walls of the meandering grooves 120 and 220 as Comparative Examples illustrated in FIGS. 5A and 5B, respectively, sound waves easily escape from one side in the tire circumferential direction C to the other.

From the above, by setting Wmin/Wmax in the range of 0.35 to 0.85 for the groove width W, which varies with a predetermined repetition cycle λ (see FIG. 3), and by setting the phase difference between the first groove wall 20a and the second groove wall 20b of the meandering groove 20 to the above ⅛ to ⅜ cycle, it is easier to achieve sound waves that are reflected back from one side in the tire circumferential direction C instead of escaping to the other side, as illustrated by the dashed arrow L2 in FIG. 4. This makes it possible to realize a tire 1 with a meandering groove 20, which can improve drainage performance and control air column resonance sound, while preventing degradation of braking performance.

Further features of the tire 1 of this embodiment are described below with reference to FIGS. 2 through 4.

First, with reference to FIG. 3, further features of one meandering groove 20 will be described. As illustrated in FIG. 3, the first groove wall 20a and the second groove wall 20b of the meandering groove 20 have an amplitude A along the tire width direction B. More specifically, the first sinusoidal curve formed by the first groove wall 20a in the tread surface view has an amplitude AP1 along the tire width direction B. Also, the second sinusoidal curve formed by the second groove wall 20b in the tread surface view has an amplitude AP2 along the tire width direction B. Here, in this embodiment, the amplitude AP1 of the first sinusoidal curve and the amplitude AP2 of the second sinusoidal curve are equal. Therefore, the maximum amplitude in the tire width direction B of the first sinusoidal curve and the second sinusoidal curve in the tread surface view is the amplitude AP1 of the first sinusoidal curve or the amplitude AP2 of the second sinusoidal curve.

However, the amplitude AP1 of the first sinusoidal curve and the amplitude AP2 of the second sinusoidal curve may be different. In such a case, the maximum amplitude in the tire width direction B of the first sinusoidal curve and the second sinusoidal curve in the tread surface view means the larger of the amplitude AP1 of the first sinusoidal curve and the amplitude AP2 of the second sinusoidal curve.

Here, the repetition cycle λ of the first sinusoidal curve and the second sinusoidal curve (see FIG. 3) is preferably 15 to 100 times the maximum amplitude of the first sinusoidal curve and the second sinusoidal curve in the tire width direction B (the amplitude AP1 or AP2 in this embodiment) in the tread surface view. With this configuration, water flowing in the meandering groove 20 tends to drain out even more easily of the meandering groove 20 in the direction of the extensions of the first groove wall 20a and the second groove wall 20b as it flows from the wide section 51a to the narrow section 51b (see the dashed arrow in FIG. 3). This means that drainage performance can be further improved.

More specifically, by setting the repetition cycle λ to 15 times or more than the maximum amplitude of the first sinusoidal curve and the second sinusoidal curve, it is possible to prevent excessive concentration of water flow along the first groove wall 20a and the second groove wall 20b and along the tire circumferential direction C at the narrow section 51b. This increases the degree of improvement in drainage performance. In addition, by setting the repetition cycle λ to 100 times or less than the maximum amplitude of the first sinusoidal curve and the second sinusoidal curve, water in the meandering groove 20 is more likely to pulsate, thereby increasing the degree of improved drainage performance.

The ground contact length, which is the length in the tire circumferential direction C of the tread contact patch that contacts the road surface during tire rolling, is preferably 0.5 to 20 times the repetition cycle λ of the meandering groove 20. By the ground contact length being at least 0.5 times the repetition cycle λ of the meandering groove 20, the meandering groove 20 is grounded along the tire circumferential direction C in sufficient numbers to pulsate during tire rolling. This allows water flowing in the meandering groove 20 to drain effectively to the outer side of the meandering groove 20. Also, by the ground contact length being 20 times or less the repetition cycle λ of the meandering groove 20, water flow along the first groove wall 20a and the second groove wall 20b can easily occur in the meandering groove 20. This allows water flowing in the meandering groove 20 to drain effectively to the outer side of the meandering groove 20.

Note, that the groove depth D of the meandering groove 20 (see FIG. 1) is not limited. The groove depth D of the meandering groove 20 in this embodiment is 8 mm as an example, but it can be shallower or deeper.

Referring now to FIGS. 2 and 3, the meandering grooves 20 on the tread surface T of the tire 1 will be explained.

As illustrated in FIG. 2, three or more circumferential grooves 21 to 24 (four in this embodiment) extending along the tire circumferential direction C are formed on the tread surface T in this embodiment. Among the three or more circumferential grooves 21 to 24, one or more internal circumferential grooves 22 and 23, which are located on the inner side in the tire width direction B than outermost external circumferential grooves 21 and 24 on both sides in the tire width direction B, are composed of the meandering grooves 20.

In this way, it is preferable that the internal circumferential grooves 22 and 23, which are located on the inner side in the tire width direction B than the external circumferential grooves 21 and 24, are composed of the meandering grooves 20. The internal circumferential grooves 22 and 23 tend to have a longer extension length in a tread footprint than the external circumferential grooves 21 and 24. The resonance frequency f of air column resonance sound is expressed by (Equation 2) below. "l" is the extension length on the tread footprint, "α" is the correction factor at the opening end of the air column tube, "c" is the speed of sound, and "n" is a natural number.

$$f = nc/(2(l + \alpha))  \quad\text{(Equation 1)}$$

The value of "l" in (Equation 1) above tends to be larger in the internal circumferential grooves 22 and 23 than in the external circumferential grooves 21 and 24.

Furthermore, by composing the internal circumferential grooves 22 and 23 by the meandering grooves 20, the distance traveled in the internal circumferential grooves 22 and 23 by the sound waves exiting the internal circumferential grooves 22 and 23 from one side to the other in the tire circumferential direction C is increased. This is because sound waves are repeatedly reflected by the first groove wall 20a and the second groove wall 20b in the meandering groove 20, thus increasing the travel distance of the sound waves compared to circumferential grooves in which the groove walls extend straight along the tire circumferential direction C. Therefore, by using the meandering grooves 20, the same effect can be obtained as in the state where the value of "1" in the above (Equation 1) is increased.

In short, the internal circumferential grooves 22 and 23 tend to have a longer extension length in the tread footprint than the external circumferential grooves 21 and 24. Therefore, the value of "1" in (Equation 1) above tends to be larger in the internal circumferential grooves 22 and 23 than in the external circumferential grooves 21 and 24. As a result, based on the (Equation 1) above, the resonance frequency f of the internal circumferential grooves 22 and 23 is easily smaller than the resonance frequency f of the external circumferential grooves 21 and 24. By using these internal circumferential grooves 22 and 23 as meandering grooves 20, the effect of an even larger value of "1" in the (Equation 1) above can be achieved, as described above. In other words, the resonance frequency f of the internal circumferential grooves 22 and 23 can be further reduced. This makes it easier to promote the dispersion of resonance frequencies in the multiple circumferential grooves 21 to 24 and to achieve a reduction in the sound pressure peaks in the entire circumferential grooves 21 to 24.

In this embodiment, both of the two internal circumferential grooves 22 and 23 are composed of the meandering grooves 20, but only one of them may be composed of the meandering groove 20. However, among the internal circumferential grooves located between the two external grooves 21 and 24, it is preferable that the internal circumferential groove located most inward in the tire width direction B (in this embodiment, both of the two internal circumferential grooves 22 and 23) be composed of the meandering groove 20, and it is more preferable that all the internal circumferential grooves (in this embodiment, only the two internal circumferential grooves 22 and 23) are composed of the meandering grooves 20. This is true even when there are three or more internal circumferential grooves. In this way, the dispersion of resonance frequencies in the multiple circumferential grooves 21 to 24 is more easily promoted, and the reduction of sound pressure peaks in the entire circumferential grooves 21 to 24 is more easily achieved.

As illustrated in FIG. 2, the external circumferential grooves 21 and 24 preferably extend in a straight line along the tire circumferential direction C in the tread surface view. For convenience of explanation, circumferential grooves that extend in a straight line along the tire circumferential direction C in the tread surface view are hereinafter referred to as "straight grooves". By making the external circumferential grooves 21 and 24 straight grooves, compared to the configuration in which the external circumferential grooves are meandering grooves 20, the width of each block land portion of shoulder land portions 31 and 35 in the tire width direction B does not vary in the tire circumferential direction C. Therefore, the compressive stiffness of each block land portion of the shoulder land portions 31 and 35 can be prevented from varying in the tire circumferential direction C. Therefore, vibration and noise caused by variations in the compressive stiffness of each block land portion of the shoulder land portions 31 and 35 in the tire circumferential direction C can be suppressed. In other words, the influence of axial force variations can be reduced.

From another perspective, as illustrated in FIG. 2, in this embodiment, the internal circumferential grooves 22 and 23 which are adjacent to the external circumferential grooves 21 and 24 are composed of the meandering grooves 20, and a resonator 70 is provided in a land portion defined between the external circumferential grooves 21 and 24, and the internal circumferential grooves 22 and 23, which is adjacent to the external circumferential grooves 21 and 24 and composed of the meandering grooves 20 (intermediate land portions 32 and 34 in this embodiment).

The resonator 70 is a Helmholtz resonator with an air chamber 71 and one or more external narrowed necks 72. The air chamber 71 is open to the tread surface of the land portion. The external narrowed neck 72 connects the air chamber 71 to the external circumferential grooves 21 and 24. More specifically, the external narrowed neck 72 of the resonator 70 provided in the intermediate land portions 32 connects the air chamber 71 to the external circumferential groove 21. Also, the external narrowed neck 72 of the resonator 70 provided in the intermediate land portion 34 connects the air chamber 71 to the external circumferential groove 24.

The resonator 70 is not provided with an internal narrowed neck that connects the air chamber 71 to the internal circumferential grooves 22 and 23. That is, the resonator 70 provided in the intermediate land portion 32 does not comprise an internal narrowed neck that connects the air chamber 71 to the internal circumferential groove 22. Also, the resonator 70 provided in the intermediate land portion 34 does not comprise an internal narrowed neck that connects the air chamber 71 to the internal circumferential groove 23.

In this way, a Helmholtz resonator as the resonator 70 is provided in the land portion (intermediate land portions 32 and 34 in this embodiment) defined between the external circumferential grooves 21 and 24, and the internal circumferential grooves 22 and 23, which are adjacent to the external circumferential grooves 21 and 24 and composed of the meandering grooves 20. The resonator 70 comprises an external narrowed neck 72 that connects the air chamber 71 to the external circumferential grooves 21 and 24, and is not provided with an internal narrowed neck that connects the air chamber 71 to the internal circumferential grooves 22 and 23. This configuration allows the resonator 70 to reduce the sound pressure peaks of the air column resonance sound in the external circumferential grooves 21 and 24. Furthermore, the resonator 70 is not provided with an inner narrowed neck, so the first groove wall 20a and the second groove wall 20b of the sinusoidally meandering groove 20 are not divided by the inner narrowed neck. When other conditions are the same, the rigidity of the land portion with meandering groove walls as sidewalls is less than that of the land portion with straight groove walls along the tire circumferential direction C. Therefore, if the meandering first groove wall 20a and second groove wall 20b are divided in the tire circumferential direction C, the rigidity of the land portion with the first groove wall 20a as a side wall and the land portion with the second groove wall 20b as a side wall, may be extremely reduced. Therefore, by configuring the first groove wall 20a and the second groove wall 20b of the meandering groove 20 not to be divided by the internal narrowed neck, as in this embodiment, the rigidity of the land portion where the resonator 70 is provided can be prevented from being extremely reduced. As a result, the reduction in braking performance of the tire 1 can be controlled.

Each of the intermediate land portions 32 and 34 is provided with a plurality of resonators 70, which are spaced apart in the tire circumferential direction C. Among the plurality of resonators 70 in each of the intermediate land portions 32 and 34, the distance between two adjacent resonators 70 in the tire circumferential direction C is set to be equal to or less than the ground contact length, which is the length of the tread contact patch in tire circumferential direction C. The length of the air chamber 71 of the resonator 70 in the tire circumferential direction C is also set to be equal to or less than the ground contact length. The air chamber 71 of the resonator 70 in this embodiment has an elongated shape along the tire circumferential direction C in the tread surface view (see FIG. 2), but its shape is not particularly limited. Also, each resonator 70 in this embodiment has only one external narrowed neck 72, but the number of the external narrowed necks 72 is not particularly limited.

Viewed from yet another perspective, as illustrated in FIG. 2, the four circumferential grooves 21 to 24 in this embodiment have two internal circumferential grooves 22 and 23 that mutually define the central land portion 33 intersecting the tire equatorial plane CL. The central land portion 33 is not provided with a resonator, which comprises an air chamber that is open to the tread surface and a narrowed neck that connects this air chamber to at least one of the two internal circumferential grooves 22 and 23. In other words, the central land portion 33, which intersects the tire equatorial plane CL, is not provided with a Helmholtz resonator like the resonators 70 provided in the intermediate land portions 32 and 34. This configuration prevents the reduction in rigidity of the central land portion 33, which is located in the center in the tire width direction B of the tread surface T.

In particular, in this embodiment, the central land portion 33 is defined by two internal circumferential grooves 22 and 23, which are composed of the meandering grooves 20. If a Helmholtz resonator were to be provided in the central land portion 33, the narrowed neck would be connected to one of the two internal circumferential grooves 22 and 23. In such a case, the rigidity of the central land portion 33 may be extremely reduced due to the breakup of the first groove wall 20a and the second groove wall 20b of the meandering groove 20, as described above. Therefore, if the central land portion 33 is defined by two internal circumferential grooves 22 and 23, which composed of the meandering grooves 20, as is the case in this embodiment, it is preferable not to dispose the Helmholtz resonator in the central land portion 33.

Figure 6:
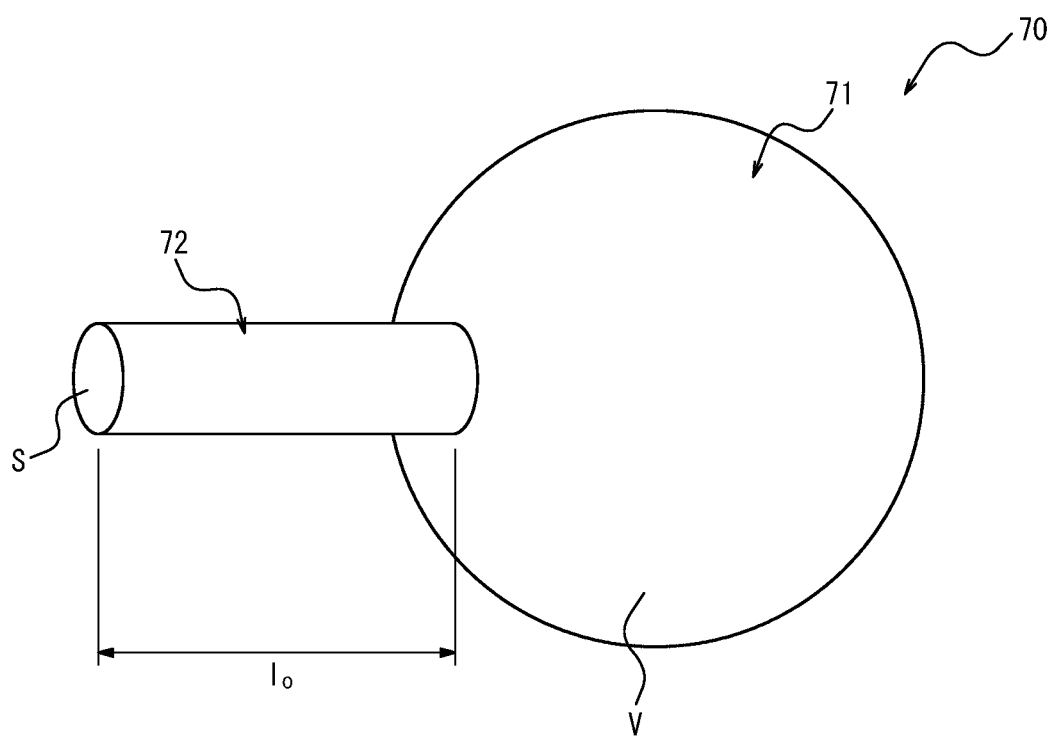
FIG. 6 schematically illustrates a Helmholtz resonator with a single external narrowed neck.

The resonator 70, which is a Helmholtz resonator, can be modeled as illustrated in FIG. 6, and its resonance frequency $f_0$ can be expressed by the following equation (2), where $l_0$ is the extension length, S is the cross-sectional area, V is the volume of air chamber 71, and c is the sound speed, of the outer narrowed neck 72.

$$f_0 = \frac{c}{2\pi}\sqrt{\frac{S}{l_0 V}} \quad \text{(Equation 2)}$$

However, the length $l_0$ of the external narrowed neck 72 should not be an actual measurement value, but rather an opening-edge corrected value that considers the additional vibration of the air around the opening in addition to the air inside the resonator 70.

Therefore, the resonance frequency $f_0$ of the resonator 70 can be varied as required by selecting the cross-sectional area S of the outer narrowed neck 72, the length $l_0$ of the outer narrowed neck 72, and the volume V of the air chamber 71. If there are multiple outer narrowed necks 72 connected to one air chamber 71, it has been found that there is no practical problem in performing the calculation by assuming that they are equivalent to a single outer narrowed neck 72 with a cross-sectional area that is the sum of the cross-sectional areas of these multiple outer narrowed necks 72 and with the average length of the multiple outer narrowed necks 72 as the extension length.

As mentioned above, a width direction groove 40 is formed in the shoulder land portions 31 and 35, which are mutually defined by the external circumferential grooves 21 and 24 and the tread edge TE of the tread surface T, respectively. Furthermore, as mentioned above, the width direction groove 40 in this embodiment opens into, i.e., is connected to, the external circumferential grooves 21 and 24.

Here, the width direction groove 40 in this embodiment is formed at a position that overlaps the extension line of the external narrowed neck 72 of the resonator 70. In other words, assuming an extension line of the outer narrowed neck 72 of the resonator 70 to the opposite side of the resonator 70 from the side connected to the air chamber 71, the width direction groove 40 of the shoulder land portions 31 and 35 extend so that it overlaps this extension line. This configuration allows for both drainage performance and design characteristics.

In addition, as illustrated in FIG. 2, the four circumferential grooves 21 to 24 comprise two internal circumferential grooves 22 and 23 that are composed of the meandering grooves 20, and the repetition cycle λ in the tire circumferential direction C of one of the internal circumferential grooves 22 that is composed of the meandering groove 20 has a phase difference in the tire circumferential direction C from the repetition cycle λ in the tire circumferential direction C of the other one of the internal circumferential grooves 23 that is composed of the meandering groove 20. In other words, the repetition period λ of the internal circumferential groove 22 and the repetition period λ of the internal circumferential groove 23 are misaligned in the tire circumferential direction C. In other words, the position of the maximus width Wmax of the internal circumferential groove 22 and the position of the maximus width Wmax of the internal circumferential groove 23 are different in the tire circumferential direction C. Similarly, the position of the minimum width Wmin of the internal circumferential groove 22 and the position of the minimum width Wmin of the internal circumferential groove 23 are different in the tire circumferential direction C. In this way, excessive variations in compression stiffness in the tire circumferential direction C can be controlled. This allows noise to be suppressed.

The tire pertaining to the present disclosure is not limited to the specific configuration explained in the embodiments described above, and various variations, changes, and combinations are possible as long as they do not depart from the scope of the claims. The tire 1 illustrated in the embodiment above comprises four circumferential grooves 21 to 24 on the tread surface T, but it can be configured with circumferential grooves composed of one or more meandering grooves 20. Thus, the tire 1 may be configured with five or more circumferential grooves. In such a case, the five or more circumferential grooves are composed of two external circumferential grooves and three or more internal circumferential grooves. Only one of these three or more internal circumferential grooves may be composed of the meandering groove 20. Or, a plurality, but not all, of the three or more internal circumferential grooves may be composed of the meandering grooves 20. Or, all of the three or more internal circumferential grooves may be composed of the meandering grooves 20. When the plurality of internal circumferential grooves are composed of the meandering grooves 20, the repetition cycle λ of the plurality of meandering grooves 20 preferably have a phase difference in the tire circumferential direction C, in order to control the variation of compression stiffness in the tire circumferential direction C, as mentioned above.

In addition, the two internal circumferential grooves 22 and 23 in the embodiment described above are composed of the meandering grooves 20 of the same shape and dimensions, with only a phase difference in the tire circumferential direction C. However, the two internal circumferential grooves 22 and 23 may be composed of the meandering grooves 20 that differ from each other in at least one of shape and dimension. However, it is preferable that the grooves be composed of the meandering grooves 20 of the same shape and dimensions, such as the two internal circumferential grooves 22 and 23 in the embodiment described above. In this way, the variation in compression stiffness in the tire circumferential direction C can be easily controlled by providing a phase difference in the two internal circumferential grooves 22 and 23 in the tire circumferential direction C.

Furthermore, the two internal circumferential grooves 22 and 23, which are composed by the meandering groove 20 in the embodiment described above, are formed at equal distances apart from the tire equatorial plane CL on both sides in the tire width direction B across the tire equatorial plane CL. Specifically, for example, the distance from the tire equatorial plane CL in the tire width direction B of the center of the groove width at the position of the maximum width Wmax of the internal circumferential groove 22 and the center of the groove width at the position of the maximum width Wmax of the internal circumferential groove 23 should be equal. The same may be done for the position of the center of the groove width of the internal circumferential grooves 22 and 23 at the position of the minimum width Wmin. In this way, when there are multiple meandering grooves 20, these multiple grooves 20 are preferably located at equal distances apart from the tire equatorial plane CL on both sides in the tire width direction B across the tire equatorial plane CL. In this way, the influence of axial force variation due to the meandering grooves 20 can be prevented from varying from one side in the tire width direction B to the other.

INDUSTRIAL APPLICABILITY

This disclosure relates to a tire.

REFERENCE SIGNS LIST

1 Tire
7 Tread rubber
8 Side rubber
11 Bead portion
11*a* Bead core
11*b* Bead filler
12 Sidewall portion
13 Tread portion
14 Carcass
15 Belt
16 Inner liner
20 Meandering groove
20 First groove wall
20*b* Second groove wall
20*c* Groove bottom
21, 24 External circumferential groove (Circumferential groove)
22, 23 Internal circumferential groove (Circumferential groove, Meandering groove in the above embodiment)
31, 35 Shoulder land portion
32, 34 Intermediate land portion
33 Central land portion
40 Width direction groove
51*a* Wide section
51*b* Narrow section
70 Resonator
71 Air chamber
72 Outer narrowed neck
120, 220 Meandering groove as a Comparative Example
120*a*, 220*a* First groove wall of the meandering groove in the Comparative Example
120*b*, 220*b* Second groove wall of the meandering groove in the Comparative Example
A Tire radial direction
B Tire width direction
C Tire circumferential direction
AP1 Amplitude of the first sinusoidal curve formed by the first groove wall
AP2 Amplitude of the second sinusoidal curve formed by the second groove wall
CL Tire equatorial plane
D groove depth
L1-L6 Sound waves
W Groove width
λ repetition cycle

The invention claimed is:

1. A tire with a meandering groove extending along tire circumferential direction formed on a tread surface, wherein
the meandering groove has a groove width in tire width direction that varies at a predetermined repetitive cycle along the tire circumferential direction,
when the maximum width of the groove width is Wmax and the minimum width of the groove width is Wmin, ratio of the maximum and minimum widths, Wmin/Wmax, is 0.35 to 0.85,
a first groove wall and a second groove wall, which are both groove walls of the meandering groove, meander and extend in a sinusoidal manner with the predetermined repetition cycle as one cycle length in a tread surface view,
in the tread surface view, a first sinusoidal curve formed by the first groove wall and a second sinusoidal curve formed by the second groove wall are arranged with a phase difference of ⅛ to ⅜ cycle in the tire circumferential direction,
three or more circumferential grooves extending along the tire circumferential direction are formed on the tread surface,
among the three or more circumferential grooves, one or more internal circumferential grooves, which are located on the inner side in the tire width direction than outermost external circumferential grooves on both sides in the tire width direction, are composed of the meandering grooves,
the one or more internal circumferential grooves comprise two internal circumferential grooves mutually defining a land portion, and
the maximum amplitude of the first sinusoidal curve formed by the first groove wall of one of the two internal circumferential grooves, the maximum amplitude of the second sinusoidal curve formed by the second groove wall of the one of the two internal circumferential grooves, the maximum amplitude of the first sinusoidal curve formed by the first groove wall of the other of the two internal circumferential grooves and the maximum amplitude of the second sinusoidal curve formed by the second groove wall of the other of the two internal circumferential grooves are equal in the tread surface view.

2. The tire according to claim 1, wherein the repetition cycle of the first sinusoidal curve and the second sinusoidal curve is 15 to 100 times the maximum amplitude of the first sinusoidal curve and the second sinusoidal curve in the tire width direction in the tread surface view.

3. The tire according to claim 1, wherein the external circumferential grooves extend in a straight line along the tire circumferential direction in the tread surface view.

4. The tire according to claim 3, wherein the one of the two internal circumferential grooves is adjacent to one external circumferential groove of the external circumferential grooves, a resonator is provided in a land portion defined between the one external circumferential groove and the one of the two internal circumferential grooves, the resonator comprises:
an air chamber that is open to a tread surface of the land portion, and
one or more external narrowed necks that connect the air chamber to the one external circumferential groove, and the resonator is not provided with an internal narrowed neck that connects the air chamber to the one of the two internal circumferential grooves.

5. The tire according to claim 4, wherein a shoulder land portion, which is defined between the one external circumferential groove and a tread edge of the tread portion, comprises a width direction groove, which opens to the one external circumferential groove, at a position that overlaps an extension line of the external narrowed neck provided on the land portion.

6. The tire according to claim 4, wherein the land portion defined between the two internal circumferential grooves comprises a central land portion intersecting the tire equatorial plane, and the central land portion is not provided with a resonator comprising an air chamber that is open to a tread surface and a narrowed neck that connects the air chamber to at least one of the two internal circumferential grooves.

7. The tire according to claim 3, wherein the repetition cycle in the tire circumferential direction of the one of the two internal circumferential grooves has a phase difference in the tire circumferential direction from the repetition cycle in the tire circumferential direction of the other of the two internal circumferential grooves.

8. The tire according to claim 1, wherein the one of the two internal circumferential grooves is adjacent to one external circumferential groove of the external circumferential grooves, a resonator is provided in a land portion defined between the one external circumferential groove and the one of the two internal circumferential grooves, the resonator comprises:
an air chamber that is open to a tread surface of the land portion, and
one or more external narrowed necks that connect the air chamber to the one external circumferential groove, and the resonator is not provided with an internal narrowed neck that connects the air chamber to the one of the two internal circumferential grooves.

9. The tire according to claim 8, wherein a shoulder land portion, which is defined between the one external circumferential groove and a tread edge of the tread portion, comprises a width direction groove, which opens to the one external circumferential groove, at a position that overlaps an extension line of the external narrowed neck provided on the land portion.

10. The tire according to claim 9, wherein the land portion defined between the two internal circumferential grooves comprises a central land portion intersecting the tire equatorial plane, and the central land portion is not provided with a resonator comprising an air chamber that is open to a tread surface and a narrowed neck that connects the air chamber to at least one of the two internal circumferential grooves.

11. The tire according to claim 9, wherein the repetition cycle in the tire circumferential direction of the one of the two internal circumferential grooves has a phase difference in the tire circumferential direction from the repetition cycle in the tire circumferential direction of the other of the two internal circumferential grooves.

12. The tire according to claim 8, wherein the land portion defined between the two internal circumferential grooves comprises a central land portion intersecting the tire equatorial plane, and the central land portion is not provided with a resonator comprising an air chamber that is open to a tread surface and a narrowed neck that connects the air chamber to at least one of the two internal circumferential grooves.

13. The tire according to claim 12, wherein the repetition cycle in the tire circumferential direction of the one of the two internal circumferential grooves has a phase difference in the tire circumferential direction from the repetition cycle in the tire circumferential direction of the other of the two internal circumferential grooves.

14. The tire according to claim 8, wherein the repetition cycle in the tire circumferential direction of the one of the two internal circumferential grooves has a phase difference in the tire circumferential direction from the repetition cycle in the tire circumferential direction of the other of the two internal circumferential grooves.

15. The tire according to claim 1, wherein the repetition cycle in the tire circumferential direction of the one of the two internal circumferential grooves has a phase difference in the tire circumferential direction from the repetition cycle in the tire circumferential direction of the other of the two internal circumferential grooves.

* * * * *